United States Patent
Morton

(10) Patent No.: US 7,440,543 B2
(45) Date of Patent: Oct. 21, 2008

(54) X-RAY MONITORING

(75) Inventor: Edward James Morton, Guildford (GB)

(73) Assignee: Rapiscan Systems, Inc., Hawthorne, CA (US)

( * ) Notice: Subject to any disclaimer, the term of this patent is extended or adjusted under 35 U.S.C. 154(b) by 80 days.

(21) Appl. No.: 10/554,655

(22) PCT Filed: Apr. 23, 2004

(86) PCT No.: PCT/GB2004/001751

§ 371 (c)(1),
(2), (4) Date: Oct. 25, 2005

(87) PCT Pub. No.: WO2004/097344

PCT Pub. Date: Nov. 11, 2004

(65) Prior Publication Data

US 2006/0203961 A1 Sep. 14, 2006

(30) Foreign Application Priority Data

Apr. 25, 2003 (GB) ................................. 0309385.3

(51) Int. Cl.
G01N 23/06 (2006.01)

(52) U.S. Cl. ................................. 378/53; 378/9; 378/10
(58) Field of Classification Search ...................... 378/9, 378/10, 51–59, 62
See application file for complete search history.

(56) References Cited

U.S. PATENT DOCUMENTS

| 4,228,353 A | * | 10/1980 | Johnson .................... 250/356.1 |
| 4,266,425 A | | 5/1981 | Allport ...................... 73/61.41 |
| 4,866,745 A | * | 9/1989 | Akai ............................. 378/9 |
| 4,868,856 A | | 9/1989 | Frith et al. .................... 378/86 |

FOREIGN PATENT DOCUMENTS

| GB | 2 212 903 | 8/1989 |
| JP | 570175247 | 10/1982 |
| JP | 60 0015546 | 1/1985 |
| JP | 60 0021440 | 2/1985 |
| WO | WO 99/60387 | 11/1999 |

* cited by examiner

Primary Examiner—Courtney Thomas
(74) Attorney, Agent, or Firm—PatentMetrix

(57) ABSTRACT

Apparatus for monitoring in real time the movement of a plurality of substances in a mixture, such as oil water and air flowing through a pipe (24), comprises an X-ray scanner (8) arranged to make a plurality of scans of the mixture over a monitoring period to produce a plurality of scan data sets, and control means (26) arranged to analyse the data sets to identify volumes of each of the substances and to measure their movement. By identifying volumes of each of the substances in each of a number of layers and for each of a number of scans, real time analysis and imaging of the substance can be achieved.

38 Claims, 3 Drawing Sheets

X-RAY MONITORING

CROSS-REFERENCE TO RELATED APPLICATIONS

The present application is a national stage application of PCT/GB2004/001751, filed on Apr. 23, 2004. The present application further relies on Great Britain Patent Application Number 0309385.3, filed on Apr. 25, 2003, for priority.

BACKGROUND OF THE INVENTION

The present invention relates to the monitoring of mixtures, and in particular to real time monitoring using X-ray scanning. It has application in a number of fields where the monitoring and imaging of mixtures is required, and is particularly applicable to the measurement of the flow rates of the different fractions in moving mixtures of fluids, such as the measurement of oil flow from oil wells. It is also applicable to slurry flow monitoring and measurement, the monitoring of fluidization processes, and in the monitoring of mixing processes.

Typically, an oil well is one of a number of wells that collectively form an oil field. As well as extracting oil, water and gas from an individual oil well, it is sometimes necessary to recycle water down an oil well back into the ground. Typically, this pumped water is used to facilitate diffusion of oil through the porous rocks in the ground towards a well (or wells) for subsequent collection. By careful design of pumping and extraction rates, it is possible to maximise the yield of oil from the field.

Often, the output from several extracting oil wells are joined into a single pipeline for subsequent downstream processing. To optimise the production process, it is necessary to know the fraction of oil and water in the liquid phase and also to know the volumes of oil and water produced by each well in the field. By combining this information with an understanding of the geophysics and seismology data of the field itself, it is believed to be possible to improve on the quantity of oil produced from the field and to reduce the cost of production. Such measurements of oil and water phase fraction and velocity require instrumentation to be placed at the well head.

Known instrumentation for this purpose relies on measurement of linear attenuation coefficient of the flow using a dual-energy gamma measurement once the flow has been homogenised by use of a mechanical system. A second known approach is to measure electrical properties of the fluid (including permittivity and conductivity) and from this to infer phase fraction of oil and water.

SUMMARY OF THE INVENTION

The present invention provides apparatus for monitoring in real time the movement of a plurality of substances in a mixture, the apparatus comprising an X-ray scanner arranged to make a plurality of scans of the mixture over a monitoring period to produce a plurality of scan data sets, and control means arranged to analyse the data sets to identify volumes of each of the substances and to measure their movement.

Preferably the apparatus is arranged, on each scan, to produce a data set relating to a layer of the mixture. More preferably the control means is arranged to define a plurality of volume elements in said layer and to use a measure of the X-ray attenuation in each of said volume elements to form the data set. Still more preferably the control means is arranged to use the data sets to determine the amount of at least one of the substances in said layer.

Preferably the control means is arranged to use the data sets from each of the scans to determine a time averaged value of the amount of said at least one substance.

Preferably the scanner is arranged to produce data sets relating to a plurality of layers of the mixture, the layers being in different positions from each other. More preferably the control means is arranged to use the data sets relating to said plurality of layers to measure movement of at least one of the substances. Still more preferably the control means is arranged to track the movement of regions of said substance through the plurality of layers to determine a flow velocity of said substance.

The control means may be arranged to measure the movement of a region of a first one of the substances, to determine a measure of the buoyancy of said region relative to at least one other substance, and to measure the movement of said at least one other substance using the movement of said region and said buoyancy.

Preferably the control means is arranged to define a model for calculating a parameter of movement of the substances on the basis of a number of variables, to produce a measured value of the parameter from the scan data sets, and to determine at least one of said variables from the measured value and the model.

The control means may be arranged to determine a flow rate of at least one of the substances, the flow rate being defined as the amount of said substance flowing through a predetermined region in a predetermined time.

Preferably the control means is arranged to analyse a scan data set in two stages, one stage providing a lower spatial resolution and higher contrast resolution than the other. In this case the control means is preferably arranged to use the higher spatial resolution analysis to identify volumes of a first of said substances and to use the higher contrast analysis to distinguish between volumes of two further substances. For example the control means may be arranged to use the high spatial resolution analysis to adjust a measure of X-ray attenuation, of volume elements defined in the low spatial resolution analysis, to account for the presence in said volume elements of the first substance. This is particularly useful where the mixture contains two substances of similar X-ray attenuation coefficient, for example both being in a liquid phase or both being in a solid phase, such as oil and water, and another substance of a significantly different X-ray attenuation coefficient, for example being of a different phase e.g. a gas, such as air.

The scanner may be arranged to be placed around a pipe or other conduit to measure the movement of the substances through the pipe or conduit. Alternatively the scanner may be placed adjacent to or around a container in which the mixture is undergoing a fluidization or mixing process.

The apparatus may further comprise display means arranged to display an image of the mixture controlled by the control means. For example the display means may be arranged to display a video image of the mixture.

The present invention further provides a method of monitoring in real time the movement of a plurality of substances in a mixture, the method comprising making a plurality of X-ray scans of the mixture over a monitoring period to produce a plurality of scan data sets, and analysing the data sets to identify volumes of each of the substances and to measure their movement.

BRIEF DESCRIPTION OF THE DRAWINGS

Preferred embodiments of the present invention will now be described by way of example only with reference to the accompanying drawings in which.

DETAILED DESCRIPTION OF THE DRAWINGS

Figure 1:
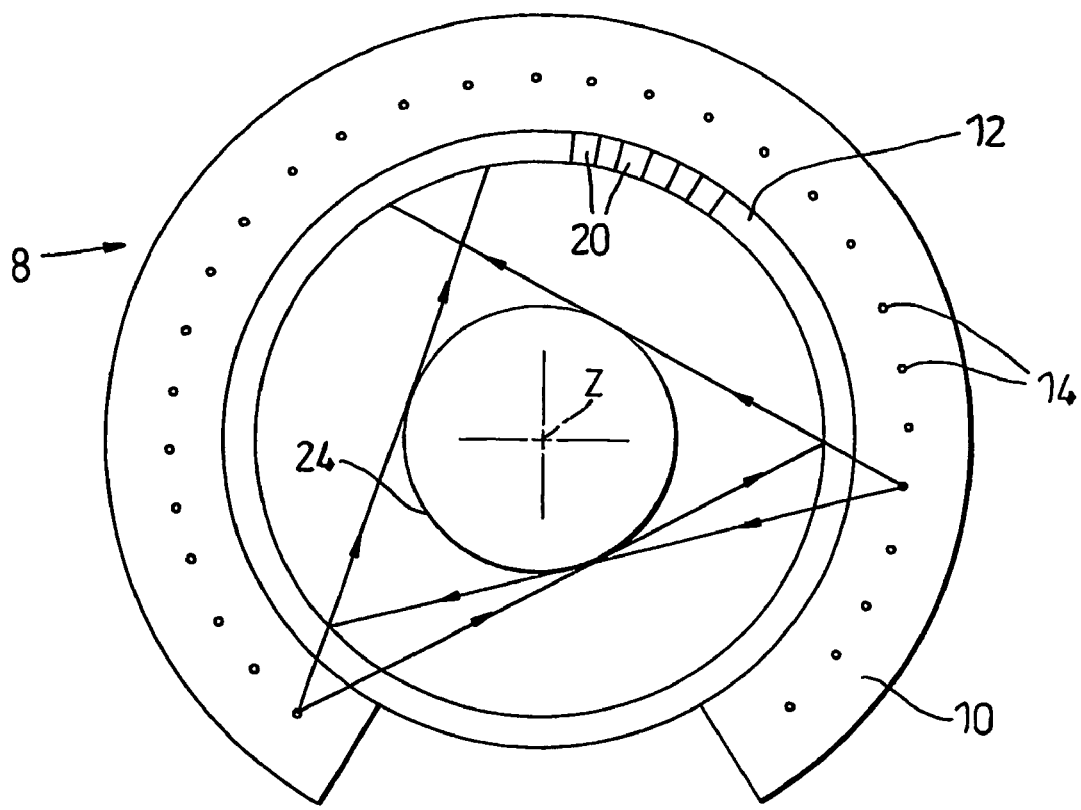
FIG. 1 is a transverse section through an X-ray scanning apparatus according to a first embodiment of the invention.
Figure 2:
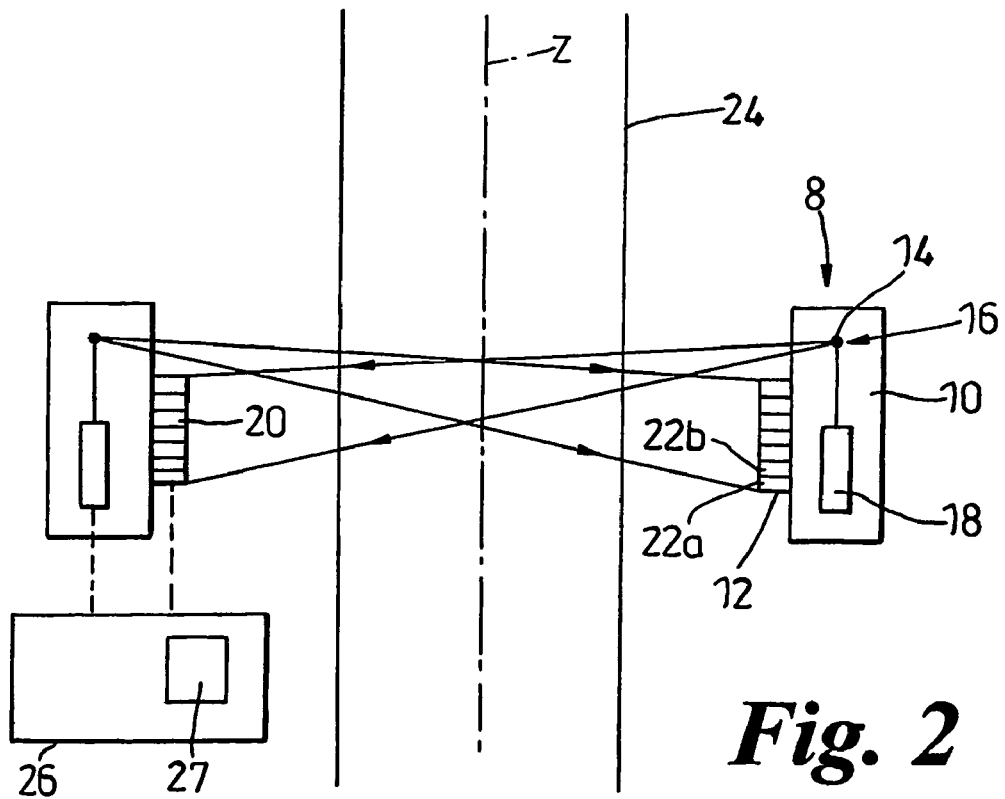
FIG. 2 is a longitudinal section through the apparatus of FIG. 1.

Referring to FIGS. 1 and 2 an X-ray scanner 8 according to a first embodiment of the invention comprises an annular multi-focus X-ray tube 10 and an annular segmented X-ray sensor array 12 located radially inwards of the X-ray tube 10. The tube 10 comprises a number of X-ray sources 14 spaced around the tube 10, each X-ray source 14 comprising a target 16 at which electrons are directed from an electron source 18. The sensor array 12 is cylindrical in form and comprises a number of sensor elements 20 arranged in a number of adjacent rings 22a, 22b. The X-ray sources 14 are just above the top of the sensor array 12 and each source 14 is arranged to direct X-rays over the part of the sensor array 12 nearest to it, and towards a wide area of the sensor array 12 on the opposite side of the scanner axis Z. The scanner 8 is placed around an oil pipe 24 so that the pipe 24 lies on the scanner axis Z. The X-ray system would normally be operated at 100-150 kVp tube voltage and 10-50 mA beam current.

A control unit 26 is connected to each of the electron sources 18 so that it can control which X-ray source 14 is active at any time, and also to each of the sensor elements 20 in the sensor array 12 so that it can determine the strength of the X-ray radiation reaching each sensor element 20 at any time. The control unit 26 controls the X-ray sources to scan repeatedly at a scan period of between 0.1 and 10 ms per scan to acquire scan data, which can be analysed to provide quantitative outputs, or to provide images of the mixture on a screen 27.

Figure 5:
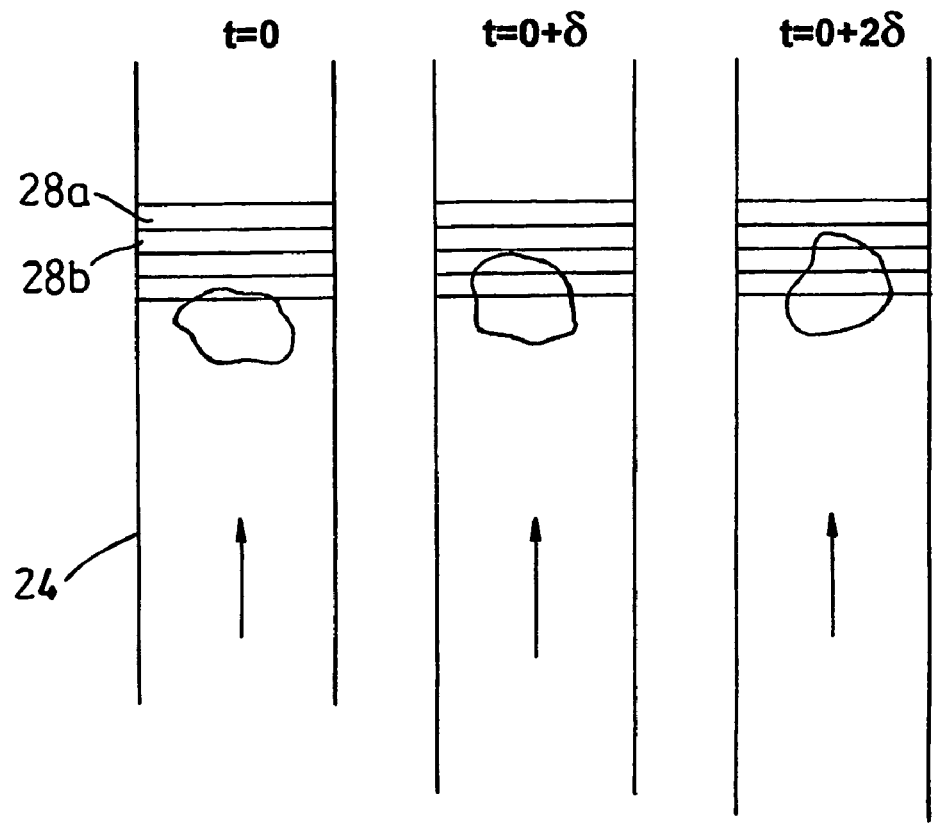
FIG. 5 shows how flow velocity is determined using the apparatus of FIG. 1.

During each scan, each of the X-ray sources 14 emits once in turn, and for each source an image data set is formed for each of a number of image rings, one image ring for each ring 22a, 22b of the sensor array 12. Each image ring is at a slight angle, in this case between 1 and 5 degrees from the normal to the pipe axis Z, due to the axial offset between the sources 14 and the sensor array 12. The control unit 26 processes the image data sets from each of the image rings produced in the scan to produce a tomographic image data set made up of a number of plane image data sets for respective image planes 28a, 28b spaced along a length of the pipe 24 as shown in FIG. 5. Typically there are between 2 and 14 planes at a plane spacing of 1 to 2 mm. Each plane image data set includes a grey level for each pixel of the image, which represents the X-ray attenuation coefficient of each of a number of corresponding volume elements (voxels) in the respective 'plane' or layer of the imaged volume. The layer has a thickness equal to the thickness of one volume element, making the plane image essentially two dimensional.

The tomographic image data sets are then processed in two stages, the first to determine the relative volumes of the various fractions in the pipe, in this case oil, water and gas, and the second to determine the absolute velocities of the oil, water and gas phases. The volume flow rate for each phase can then be determined as the product of phase fraction with phase velocity.

Figure 3:
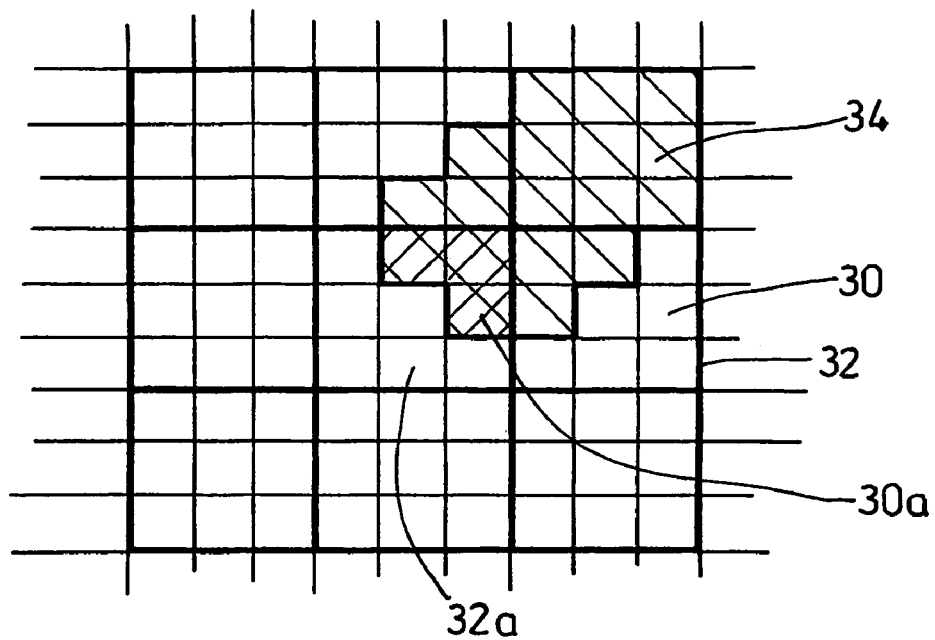
FIG. 3 shows part of a map of a volume produced by the apparatus of FIG. 1.

To determine the phase fractions two image reconstructions are generated for each image plane 28a, one at low spatial resolution but good contrast resolution and one at high spatial resolution but lower contrast resolution. Both image reconstructions use the same initial projection data set. The area of each image pixel corresponds to the cross sectional area of the corresponding voxel, and both reconstructions have the same slice thickness. FIG. 3 shows an area of the image plane 28a divided at both high and low resolution. Typically, the high-resolution image will be reconstructed with smaller pixels 30 of 2 mm pixel dimensions, while a low-resolution image may be reconstructed with larger pixels 32 of up to 10 mm pixel dimensions. In the example shown the smaller pixels 30 are of 2 mm dimension and the larger pixels 32 are of 6 mm dimension. In each image, each pixel will have a grey level indicative of the attenuation coefficient of the substance or substances in the corresponding volume element. For any volume elements which contain only one fraction, the grey level will be at one of three possible levels corresponding to oil, water and air. For any volume element containing more than one fraction, the grey level will be at a level between these three levels.

Firstly, the high resolution image is segmented, using a suitable binary segmentation process, to determine which of the smaller pixels 30 represent the gas phase, and which represent the liquid phase. This relies on the fact that the gas phase reconstructs back to a very different signal level from that of the liquid phase, so such binary segmentation is straightforward. The number of pixels representing the gas phase therefore gives a measure of the gas fraction in the image layer. In FIG. 3, the area 34 is representative of a gas bubble which fills one of the large pixels 32 and a further 9 of the small pixels 30, spread between 3 of the large pixels.

Next, any gas voxels that are identified from the high spatial resolution scan are used to apply a partial volume correction to the low spatial resolution scan as shown in FIG. 3. This correction identifies that a fraction of the low spatial resolution pixel is filled with gas, and that therefore the measured grey level is lower than possible for a liquid phase only voxel. For example the middle large pixel 32a includes 3 out of 9 small pixels 30 representing gas voxels. These are the shaded pixels 30a. *A linear volume correction is applied to correct the grey level of the large pixel 32a to account for the gas partial fraction within the corresponding voxel:*

$$\text{true} = \frac{1}{1 - V_{gas}} \cdot \text{actual}$$

where true=partial volume corrected grey level, $V_{gas}$=gas fraction of large pixel and actual=actual reconstructed grey level.

When these corrections have been made, the large pixels 32 are segmented on the basis of the corrected grey levels into those representing voxels in which gas predominates, those representing voxels in which water predominates, and those representing voxels in which oil predominates. This therefore provides a measure of the instantaneous volumetric fractions of air, oil and water in one image plane 28a. It also provides a tomographic image of the mixture flowing through the pipe 24 which can be displayed on the screen 27.

Figure 4:
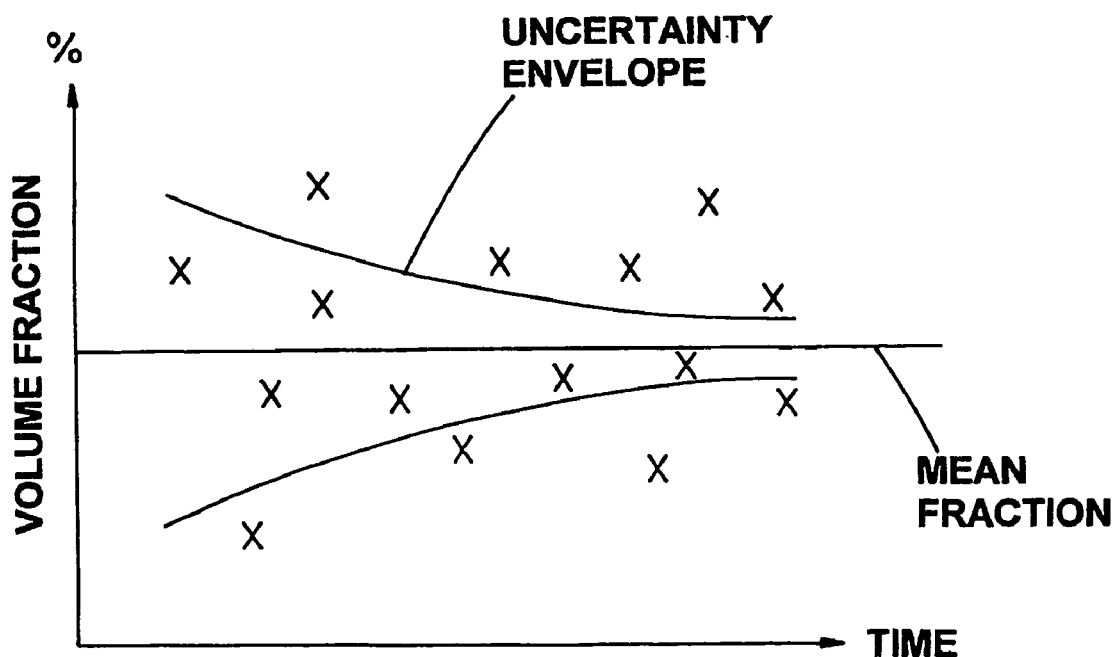
FIG. 4 is a graph showing how the error in the volume measurement using the apparatus of FIG. 1 decreases with time.

Since the flow is continuously changing, it is necessary to repeat this measurement multiple times to achieve a time-averaged measurement of the volumetric fractions of the three phases. This is shown graphically in FIG. 4 which shows a number of consecutive instantaneous phase volume fraction measurements 40 which are spread around the mean fraction. As the number of measurements increases the uncertainty in the mean volume fraction decreases. Measurement uncertainty depends on the number of voxels per image and the photon statistics within a voxel.

Typically, uncertainty in phase fraction within a single scan is at the 5% level. Uncertainty reduces to less than 1% after averaging of information from multiple data sets.

Also as a new image is produced for each scan, and the scanning period is typically between 0.1 and 10 ms as indicated above, the images produced can be combined to provide real time tomographic imaging of the flow in the pipe.

Referring to FIG. 5, flow velocity can be determined by applying cross-correlation methods between identified features in the stack of image planes 28a, 28b that are generated along the length of the pipe 24 at different times. This allows the speed of movement of those features along the pipe to be determined. In the example shown, the gas bubble 34 shown in FIG. 3 moves up the pipe 24. At a reference time t=0 the bubble 34 reaches one of the image planes 28d. At the time of the next scan, at time t=0+δ the bubble 34 is partly in the image plane 28d, and partly in the adjacent image plane 28c. At the next scanning time t=0+2δ the bubble 34 is also partly in the next image plane 28b. Using cross correlation between the images in the planes 28a, 28b, 28c, 28d allows the bubble 34 to be identified as the same feature, and its position at the time of each scan to be determined. Using the change of position between scans and the scan frequency, the velocity of the bubble 34 along the pipe can be determined. The velocity of movement of the air, together with the volumetric fraction of the air obtained as described above, allow determination of the volumetric flow rate of air through the pipe 24, that is the volume of air flowing through the pipe per unit time.

In some simple flows it will be possible to use the technique described above to identify features of each of the oil, water and gas phases in the pipe and to measure their individual velocities. In other types of flow different techniques are required to determine the flow rates of all of the phases.

One technique is to include in the calculation the buoyancy of the various fractions. In the example shown in FIG. 5, if the gas bubble 34 is surrounded entirely by oil, then its speed of motion will be determined partly by its buoyancy and partly by the velocity and viscosity of the oil. As the approximate viscosity of the oil and the approximate densities of oil and water are known, measuring the speed of the bubble 34 can be used to measure the velocity of the oil.

Alternatively the density of each of the phases can be measured. The density of each phase is very closely related to its electron density, which determines the X-ray attenuation as measured by the scanner. Therefore the measured attenuation of each voxel can be used to determine the density of the fluid in it. The measured densities can then be used to determine the buoyancy of each of the fractions.

The viscosity of each of the phases can also be measured by measuring the rate of change of shape of the features of that phase. For substances of high viscosity, such as oil, the rate of change of shape will be relatively slow, whereas for substances of lower viscosity, such as water, the rate of change of shape will be relatively fast.

For complex flow patterns mathematical modelling of the flow can be used to determine the speeds of flow and flow rates of the different phases. A model can be built up which will calculate the size, shape and velocity of the regions of each fraction based on the flow rates of each of the fractions and other variables such as the pipe size, pipe orientation, and temperature. The known variables such as pipe size and temperature are input to the model. The size of any regions of each phase that can be measured, and the flow velocities of any of the phases that can be measured are matched to find a best fit with those calculated using the model for different flow rates using a 'least squares' or similar method to determine the actual flow rates. By repeating the best fit process the results produced can be averaged to improve the accuracy of the results. This modelling technique is particularly suitable for monitoring turbulent flow, or flow with high gas fractions where reverse flow can occur.

Figure 6:
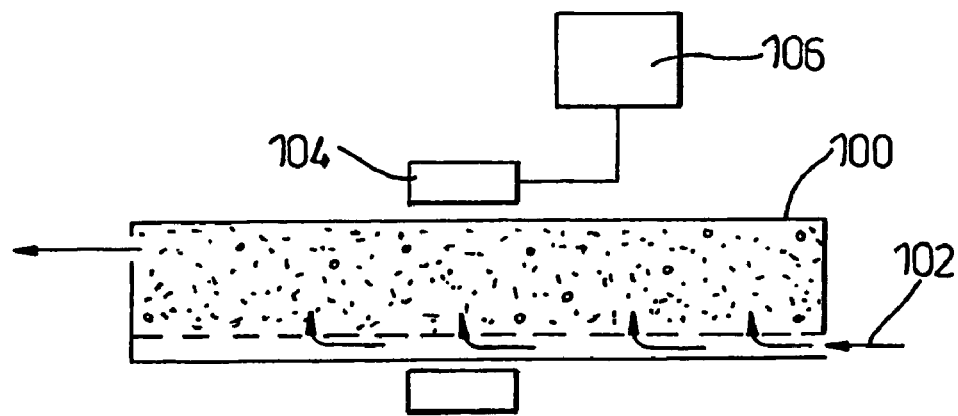
FIG. 6 is a schematic section through a scanning apparatus according to a second embodiment of the invention.

Referring to FIG. 6 in a second embodiment of the invention a bed 100 of powdered substances is fluidised by the passage of a gas 102 through it. The gas 102 acts as a catalyst for a chemical reaction. A scanner 104 operating in a similar manner to that of the first embodiment is placed around the fluidised bed 100 to produce real time tomographic imaging of the fluidised powder. This can be used to monitor and analyse the fluidisation to ensure that it is functioning as required, using a control unit 106.

It will be appreciated that the method described above can be used for real time imaging, or measuring the movement of, a variety of substances in a variety of conditions. For example as well as monitoring or measuring liquid and gas flow, it can be used to measure powder flow, in which powder is carried in a gas, and slurry flow in which a powder is carried in a liquid. It can also be used to monitor other processes such as fluidisation in which gas is passed through a powder or granular solid, for example to encourage a chemical reaction, and mixing processes to monitor how well different substances are being mixed together. Depending on the substances being monitored various other parameters can be analysed from the data, such as the size and velocity of gas bubbles, of droplets or regions of liquid, or of solid particles, or the degree of mixing of the substances.

The invention claimed is:

1. An apparatus for monitoring in real time the movement of a plurality of substances in a mixture, having at least one fluid layer, along an axis of flow within a tube, the apparatus comprising:

an X-ray scanner, wherein said X-ray scanner performs a plurality of scans of the mixture over a monitoring period to produce a plurality of scans, wherein a plurality of scan data sets are derived from said scans and wherein said X-ray scanner comprises an annular X-ray tube positioned radially outward from said tube wherein said annular X-ray tube has a plurality of X-ray sources;

an annular sensor array radially positioned between said annular X-ray tube and said tube wherein said annular sensor array comprises a plurality of sensors arranged in a plurality of rings, wherein said X-ray sources sequentially emit radiation and wherein each X-ray source directs said emitted radiation toward a portion of said sensor array positioned furthest from said X-ray source and past a portion of said sensor array positioned nearest to said X-ray source; and control means arranged to analyze the scan data sets to identify volumes of each of the substances and to measure their movement.

2. The apparatus according to claim 1 wherein the apparatus produces a scan data set relating to said at least one fluid layer of the mixture.

3. The apparatus according to claim 2 wherein the control means determines a plurality of volume elements in said layer and uses a measure of X-ray attenuation in each of said volume elements to form the scan data set.

4. The apparatus according to claim 2 wherein the control means uses the scan data sets to determine an amount of at least one of the substances in said at least one fluid layer.

5. The apparatus according to claim 4 wherein the control means uses the scan data sets from each of the scans to determine a time averaged value of the amount of said at least one substance.

6. The apparatus according to claim 2 wherein the control means produces scan data sets relating to more than one layer of the mixture, wherein the layers are in different positions from each other.

7. The apparatus according to claim 6 wherein the control means is arranged to use the scan data sets relating to said plurality of layers to measure movement of at least one of the substances.

8. The apparatus according to claim 7 wherein the control means is arranged to track a movement of regions of said substance through the plurality of layers to determine a flow velocity of said substance.

9. The apparatus according to claim 1 wherein the control means is used to measure a movement of a region of a first substance, to determine a measure of the buoyancy of said region relative to at least one other substance, and to measure a movement of said at least one other substance using the movement of said region.

10. The apparatus according to claim 1 wherein the control means calculates a parameter of movement of the plurality of substances to produce a measured value of the parameter from the scan data sets.

11. The apparatus according to claim 1 wherein the control means is used to determine a flow rate of at least one of the substances.

12. The apparatus according to claim 1 wherein the control means is used to analyze a scan data set in two stages, wherein a first stage provides a relatively lower spatial resolution and higher contrast resolution.

13. The apparatus according to claim 1 wherein the scanner is placed around a pipe to measure the movement of the substances through the pipe.

14. The apparatus according to claim 1 further comprising display means for displaying an image of the mixture generated by the control means.

15. The apparatus according to claim 14 wherein the display means displays a video image of the mixture.

16. The apparatus according to claim 1 wherein the control means uses a higher spatial resolution analysis to identify a volume of a first substance.

17. The apparatus according to claim 1 wherein the control means uses a higher contrast resolution analysis to distinguish between a volume of a first substance and a volume of a second substance.

18. The apparatus according to claim 1 wherein the control means uses a high spatial resolution analysis to adjust a measure of X-ray attenuation of volume elements defined in a low spatial resolution analysis to account for the presence in said volume elements of a first substance.

19. The apparatus according to claim 1 wherein the control structure generates a high resolution image comprising a plurality of pixels.

20. The apparatus according to claim 19 wherein the high resolution image is segmented.

21. The apparatus according to claim 20 wherein a binary segmentation process is used to segment the high resolution image.

22. The apparatus according to claim 19 wherein the high resolution image is segmented to determine which of said pixels represent a gas phase and which of said pixels represent a liquid phase.

23. The apparatus according to claim 1 wherein said annular X-ray tube and said annular sensor array completely encompass said tube.

24. The apparatus according to claim 1 wherein said annular X-ray tube and said annular sensory array partially encompass said tube.

25. A method of monitoring in real time the movement of a plurality of substances in a mixture within a tube, the method comprising:
    performing a plurality of X-ray scans of the mixture over a monitoring period to produce a plurality of scans wherein a plurality of scan data sets are derived from said scans and wherein said X-ray scans are performed using an X-ray scanner comprising
        an annular X-ray tube positioned radially outward from said tube wherein said annular X-ray tube has a plurality of X-ray sources;
        an annular sensor array radially positioned between said annular X-ray tube and said tube wherein said annular sensor array comprises a plurality of sensors arranged in a plurality of rings,
    wherein said X-ray sources sequentially emit radiation and wherein each X-ray source directs said emitted radiation toward a portion of said sensor array positioned furthest from said X-ray source and past a portion of said sensor array positioned nearest to said X-ray source; and
    analyzing the data sets to identify volumes of each of the substances and to measure their movement.

26. A method according to claim 25 wherein each scan produces a scan data set relating to a layer of the mixture.

27. A method according to claim 26 further comprising defining a plurality of volume elements in said layer and using a measure of the X-ray attenuation in each of said volume elements to form the scan data set.

28. A method according to claim 27 wherein the scan data sets are used to determine an amount of at least one substance in said layer of the mixture.

29. A method according to claim 28 wherein the scan data sets are used to determine a time averaged value of the amount of said at least one substance.

30. A method according to claim 25 wherein said scan data sets are produced relating to a plurality of layers of the mixture, wherein the layers are in different positions from each other.

31. A method according to claim 30 wherein the scan data sets relating to said plurality of layers are used to measure movement of at least one of the substances.

32. A method according to claim 24 wherein the movement of regions of said substance through the plurality of layers is tracked to determine a flow velocity of said substance.

33. A method according to claim 25 wherein movement of a region of a first substance is measured, a measure of the buoyancy of said region relative to at least one other substance is determined, and the movement of said at least one other substance is measured using the movement of said region and said buoyancy.

34. A method according claim 25 comprising the step of determining a flow rate of at least one of the plurality of substances.

35. A method according to claim 25 comprising the step of analyzing the scan data set in two stages, wherein one stage provides a relatively lower spatial resolution and higher contrast resolution.

36. A method according to claim 35 further comprising the step of identifying volumes of a first of said substances using the higher spatial resolution analysis and using the higher contrast analysis to distinguish between volumes of two further substances.

37. A method according to claim 36 further comprising the step of using the high spatial resolution analysis to adjust a measure of X-ray attenuation of volume elements defined in the low spatial resolution analysis.

38. A method according to claim 25 further comprising the step of placing the scanner around a pipe to measure the movement of the substances through the pipe.

* * * * *